United States Patent [19]  [11] 4,181,483
Pech et al.  [45] Jan. 1, 1980

[54] APPARATUS FOR THE BELLOWLESS VULCANIZATION OF TIRE BLANKS

[75] Inventors: Günther Pech, Vienna; Hans Galleithner, Baden, both of Austria

[73] Assignee: Semperit Aktiengesellschaft, Vienna, Austria

[21] Appl. No.: 696,075

[22] Filed: Jun. 14, 1976

Related U.S. Application Data

[63] Continuation of Ser. No. 261,305, Jun. 9, 1972, abandoned.

[30] Foreign Application Priority Data

Jun. 16, 1971 [AT] Austria .................................. 5208/71
Feb. 10, 1972 [AT] Austria .................................. 1094/72

[51] Int. Cl.² ............................................ B29H 5/02
[52] U.S. Cl. ......................................... 425/36; 425/21; 425/24; 425/44; 425/DIG. 44
[58] Field of Search ............ 425/24, 36, 43, 44, 425/388, DIG. 47, DIG. 48; 249/179

[56] References Cited

U.S. PATENT DOCUMENTS

| | | | |
|---|---|---|---|
| 1,586,603 | 6/1926 | Brown | 249/179 |
| 2,315,634 | 4/1943 | McCall | 249/179 |
| 2,597,550 | 5/1952 | Tritt | 425/36 |
| 2,834,049 | 5/1958 | White | 425/36 X |
| 2,834,984 | 5/1958 | Robbins | 425/24 |
| 2,854,692 | 10/1958 | Robbins | 425/24 |
| 2,959,815 | 11/1960 | Brundage | 425/36 X |
| 2,987,769 | 6/1961 | Frohlich | 425/43 |
| 3,012,277 | 12/1961 | Soderquist | 425/36 X |
| 3,095,611 | 7/1963 | Borah | 425/DIG. 47 |
| 3,162,456 | 12/1964 | Williams | 425/DIG. 47 |
| 3,184,794 | 5/1965 | Sherkin | 425/44 X |
| 3,216,062 | 11/1965 | Shaver et al. | 425/24 |
| 3,246,369 | 4/1966 | Rhoads et al. | 425/DIG. 47 |
| 3,250,660 | 5/1966 | Greig et al. | 425/DIG. 48 |
| 3,659,975 | 5/1972 | Leblond | 425/36 |
| 3,666,852 | 5/1972 | Burke | 425/DIG. 47 |

Primary Examiner—J. Howard Flint, Jr.
Attorney, Agent, or Firm—Werner W. Kleeman

[57] ABSTRACT

An apparatus for the bellowless or bagless vulcanization of tire blanks comprising a tire vulcanization mold and a clamping mechanism for the tire bead provided for the mold. The clamping mechanism comprises the associated bead section of the vulcanization mold and a contact mechanism which can be moved towards such section in the axial direction and against the center of the mold. The contact mechanism comprises a ring formed of a number of segments, and such ring is provided at least at the region of the tire bead with a continuous layer of elastomeric material. According to a further improvement, the continuous layer possesses a lip member directed towards the tire bead.

4 Claims, 11 Drawing Figures

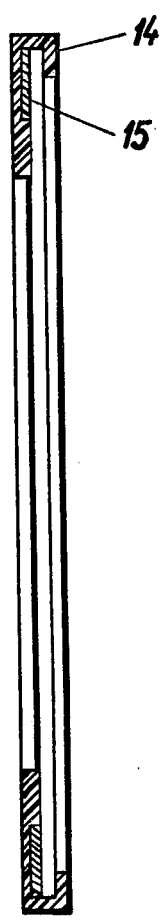
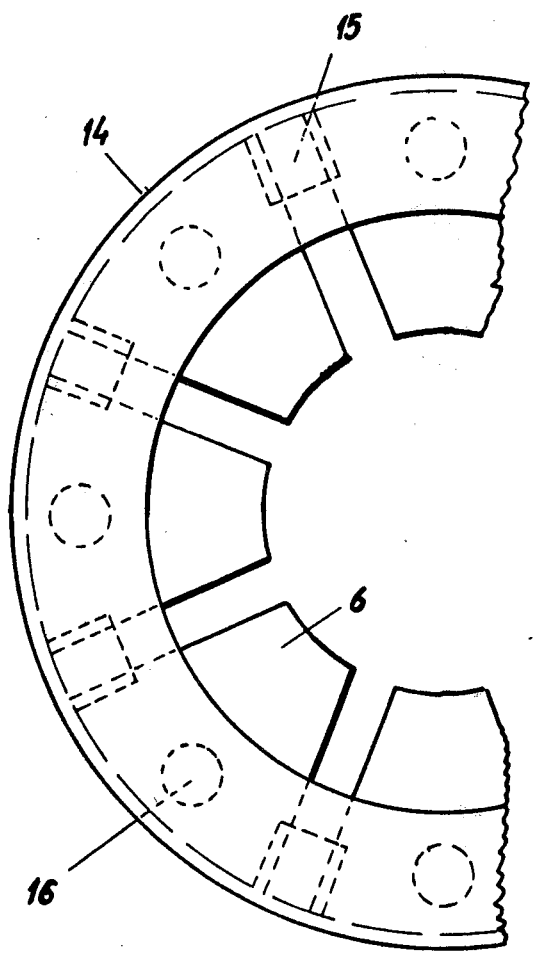

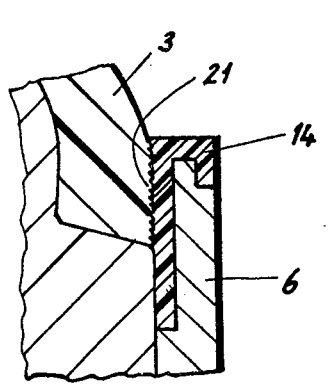
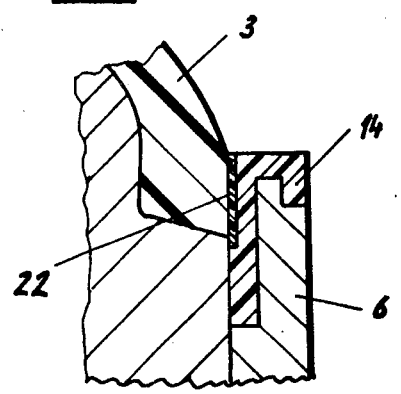
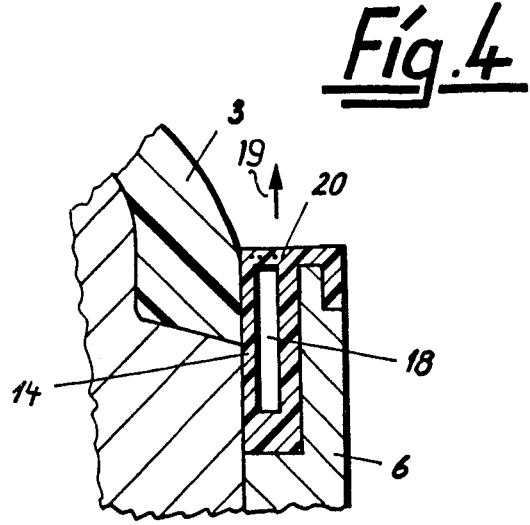

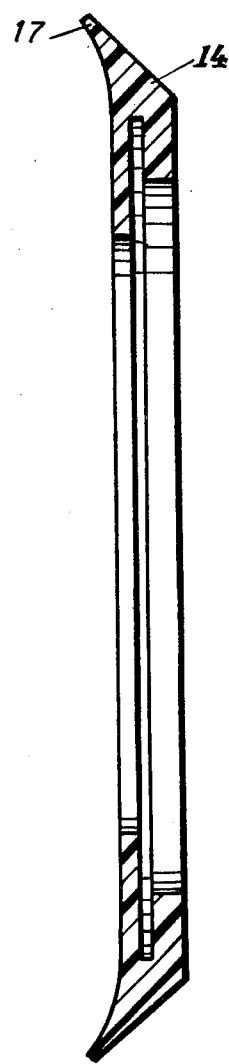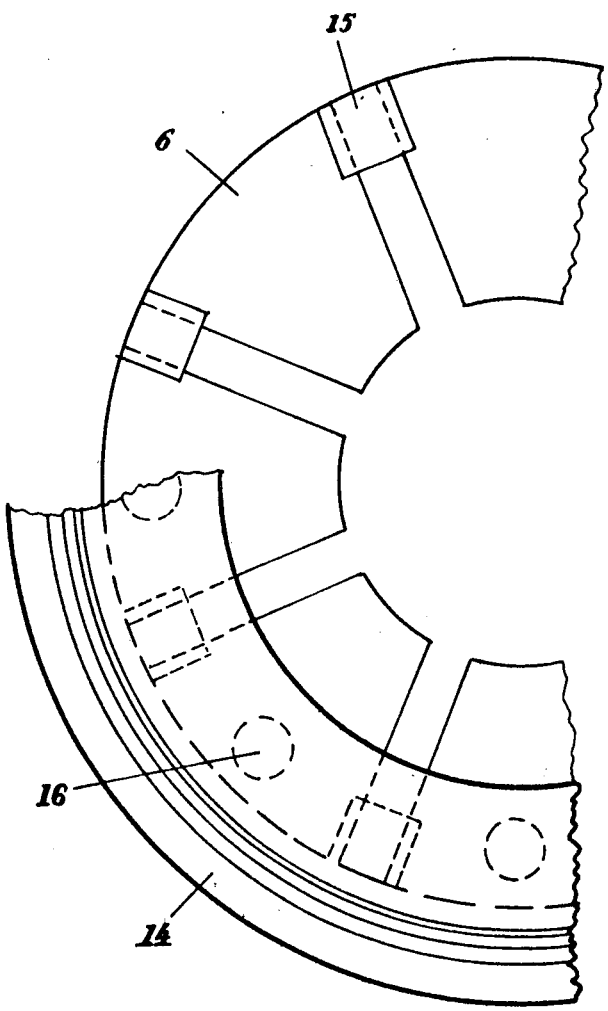

APPARATUS FOR THE BELLOWLESS VULCANIZATION OF TIRE BLANKS

CROSS REFERENCE TO RELATED APPLICATION

This is a continuation application of our commonly assigned copending U.S. application Ser. No. 261,305, filed June 9, 1972 and entitled "Apparatus For The Bellowless Vulcanization of Tire Blanks", now abandoned.

BACKGROUND OF THE INVENTION

The present invention relates to a new and improved construction of apparatus for the bellowless or bagless vulcanization of tire blanks with the aid of a clamping mechanism for the tire beads provided for the tire mold, the clamping mechanism embodying the bead sections of the vulcanization mold and a contact or press-on mechanism movable towards such sections in the axial direction and out of the bead regions towards the center of the mold.

Prior art constructions of vulcanization equipment for pneumatic vehicle tires generally consist of a multipart metallic mold corresponding to the external shape of the finished tire as well as a bellows or bag which can be expanded and heated and is arranged in such mold. By means of the expandable bellows or bag the tire blank can be bowed and pressed against the vulcanization mold. Such equipment possesses the drawback that the bellows is more or less subject to malfunction and must be exchanged within certain time intervals. Apart from the foregoing the state-of-the-art equipment of the type discussed above possesses the drawback that any irregularities which might be present at the bellows or bag are transferred to the finished vulcanized tire. Thus, for instance, during bowing or dishing of the tire blank, weaker locations of the bellows are expanded to a greater extent, so that the tire blank is also extended to a greater extent at such locations. In order to be able to remove air between the tire blank and the bellows the latter is provided at its outer surface with a number of grooves. During vulcanization these grooves appear in the form of ribs at the inside of the tire, so that distortion of the inner carcass layers can easily occur.

To avoid these drawbacks it has already been proposed to dish or bow the tires without the use of a bag or bellows. Here the tire blank is sealingly fixedly clamped at the region of the tire bead and a pressure or heating medium is applied against the inner wall of the tire. Clamping is carried out by means of rings which press the tire beads in the axial direction against the bead sections or regions of the mold. However, the tire blank must be drawn over these rings, so that automatic charging of the vulcanization press with the tire blanks is not possible. Furthermore, it has already been proposed in this particular art to press-on the tire beads by segmented rings which also can be drawn together or contracted towards the center of the mold. However, with this type of construction there is the disadvantage that the segmented rings only then form a closed ring in their outermost terminal position, yet already before that time bear against the tire beads. During this contact phase and owing to the different movements of the individual segments of the ring the bead portions of the tire blank are displaced relative to one another, producing irregularities at such regions.

Moreover, equipment has been proposed in which a rubber ring is provided between the tire beads which possesses lip members directed towards the beads and extending in the circumferential direction. The diameter of the lip members in the normal position is smaller than the innermost bead. During clamping, the lip members are bent or bowed outwardly owing to the ring member which is moved in the axial direction. This type of construction has the drawback that the contact or press-on element at the bead region consists exclusively of elastic material, therefore is incapable of generating the contact force required for exact forming of the bead section.

SUMMARY OF THE INVENTION

Hence, from what has been discussed above it should be recognized that this particular art is still in need of apparatus for the bellowless or bagless vulcanization of tire blanks which is not associated with the aforementioned drawbacks and limitations of the state-of-the-art proposals. It is thus a primary object of the present invention to provide equipment suitable for this purpose which effectively and reliably fulfills the existing need in the art.

Another and more specific object of the present invention relates to an improved construction of apparatus for the bellowless vulcanization of tire blanks in an extremely reliable, efficient and accurate manner, producing a minimum of tire rejects, and extremely suitable for mass production techniques.

Still a further significant object of this invention relates to an improved apparatus for the bellowless vulcanization of tire blanks which is relatively simple in construction, economical to manufacture, extremely reliable in operation, not readily subject to breakdown, and requires a minimum of maintenance and servicing.

Now, in order to implement these and still further objects of the invention, which will become more readily apparent as the description proceeds, the inventive apparatus is manifested by the features that the press-on or contact mechanism comprises a ring having a number of segments, and which particularly at the tire bead region incorporates a non-segmented, continuous or endless layer of elastomeric material. By virtue of these measures the tire beads do not come into direct contact with the segments and the relative movements are extensively taken-up by the elastomeric layer. On the other hand, the segments are capable of producing a sufficiently high contact pressure. In this regard it is advantageous if the layer is at least partially formed as a membrane or bellows extending in the peripheral direction. In this way there is imparted to the layer an additional elasticity and a uniform distribution of pressure over the entire contact surface. The membrane can be expanded and/or heated by means of a gaseous or liquid medium. Thus, it is possible to carry out a particularly exact vulcanization at the bead regions. It is possible to regulate the vulcanization of the bead regions independently of the vulcanization of the entire tire.

Furthermore, it is advantageous if the layer is equipped with a coating or lining preventing sticking of the tire bead. The layer can be, however, also provided at the tire bead region with a given profile which extends in the peripheral direction, such as, for instance, in the form of ribs or grooves. Thus, there is obtained a really good sealing effect. Moreover, a good distribution of the forces can be realized if the layer is at least partially provided with an outer layer or coating which is formed of a material softer than such layer.

Although the above-described construction of inventive vulcanization apparatus already provides notable advantages and improvements upon the prior art proposals, a further feature of the invention relates in improving the seal, especially at the outermost marginal region of the contact mechanism. This is to be achieved without requiring an increase in the necessary contact pressure. Now, according to a further aspect of this invention, this objective can be realized in that the continuous layer is provided with a lip member directed towards the tire bead.

By virtue of the modification under discussion the vulcanization medium is itself employed to a pronounced degree for sealing purposes in that it presses the free lip additionally against the bead of the tire blank. According to a particularly preferred constructional embodiment the segments are radially displaceable at the contact zone against the resistance of the layer so that the direction of deviation of the lip member is opposite to the associated bead section of the vulcanization mold and therefore opposite to the tire blank.

In order to increase this deviation effect it is advantageous if the lip member, which is preferably designed so as to at least be partially convex at the contact region and preferably has a curvature corresponding to the bead section of the tire, possesses, at the side confronting the tire bead, a layer or coating having a greater tensile strength in comparison to the remainder of the lip member.

A further particularly preferred manifestation of the inventive apparatus contemplates the provision of a ring-shaped reinforcement at the outer periphery of the lip member, so that again deviation of the lip member out of the radial direction is considerably assisted. It has been found to be advantageous if the ring-shaped reinforcement is constructed in the form of a helical or spiral spring.

BRIEF DESCRIPTION OF THE DRAWINGS

The invention will be better understood and objects other than those set forth above, will become apparent when consideration is given to the following detailed description thereof. Such description makes reference to the annexed drawings wherein throughout the various figures the same reference characters have been generally used for the same or analogous components and wherein:

FIG. 2 is a fragmentary front view of one form of contact mechanism;

FIG. 3 is a longitudinal sectional view of the contact mechanism depicted in FIG. 2;

FIGS. 4, 5a and 5b respectively illustrate fragmentary sectional views of different embodiments of contact or press-on mechanisms;

FIG. 7 illustrates a sectional view through another embodiment of the contact or press-on mechanism;

FIG. 10 is a fragementary front view of the contact mechanism used in the equipment of FIG. 6.

DETAILED DESCRIPTION OF THE PREFERRED EMBODIMENTS

Figure 1:
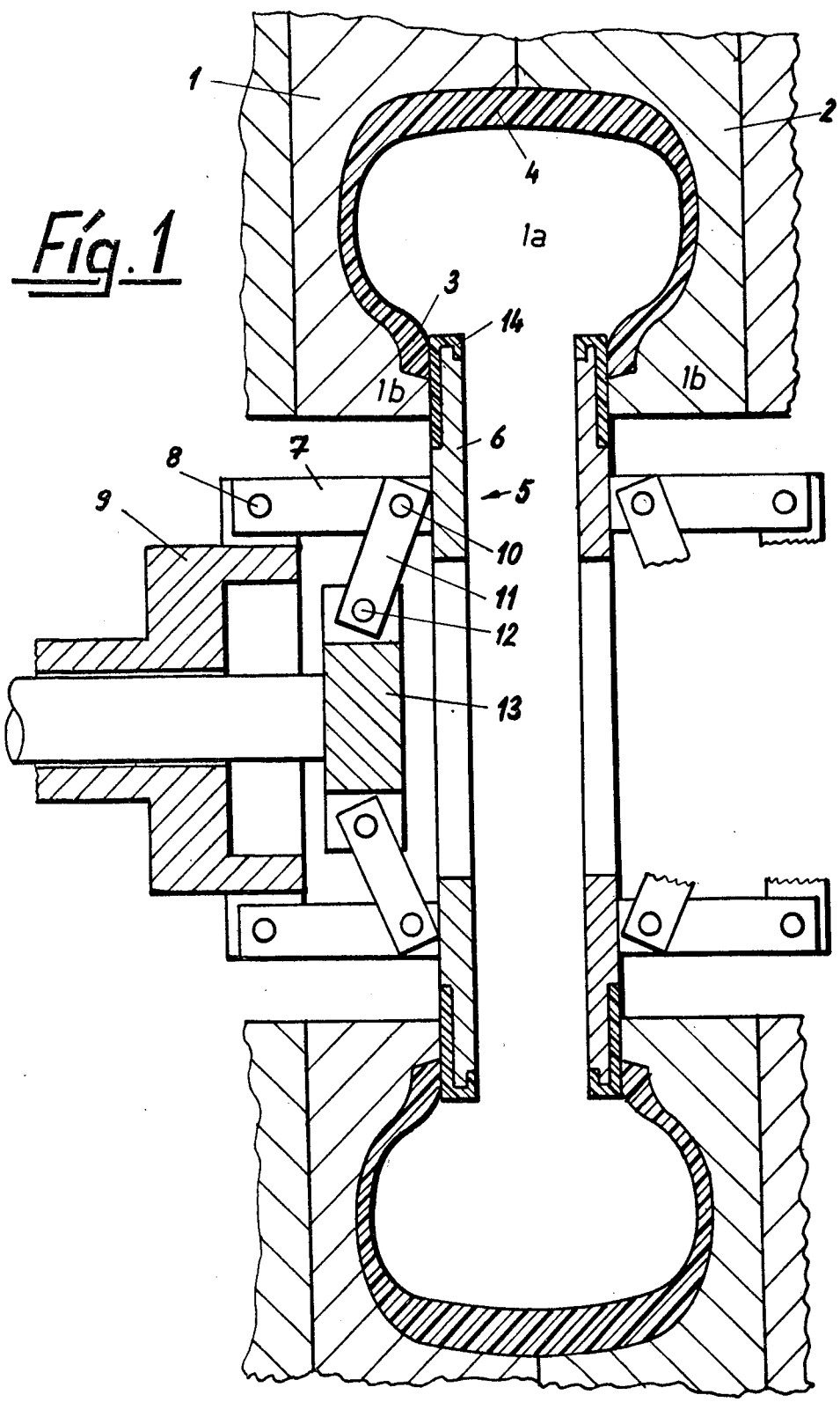
FIG. 1 is a sectional view of a preferred embodiment of the inventive apparatus for the vulcanization of tires.

Describing now the drawings, in FIG. 1 there is illustrated a tire vulcanization mold consisting of two mold halves 1 and 2 forming a mold compartment 1a including the tire bead mold wall portions or sections 1b which can be moved in the axial direction towards one another. Contact or press-on mechanisms 5 can be moved in the axial direction towards the beads 3 of a pneumatic vehicle tire 4. The contact or press-on mechanisms 5 possess segments 6 which can be moved towards the outside essentially in the radial direction, so that in their outermost position they form a ring member. The segments 6 are pivotally supported via levers 7 and shafts 8 at a hub rim 9 which can be moved in the axial direction. Intermediate levers 11 engage via pivot pins 10 with the lever 7, the intermediate levers 11 in turn being pivotably mounted via pivot pins 12 at a hub rim 13.

Now if the hub rim 13 is moved relative to the hub rim 9, then the segments 6 are either pivoted or rocked towards the inside or towards the outside. However, it is also possible to move segments 6 by other means in a plane towards the outside or the inside. Thus, the segments could be retained in guide grooves and by means of a suitable displacement mechanism moved along such guides. What is important, however, is that the segments are initially brought into their outermost terminal position before they are moved in axial direction towards the associated bead 3 of the tire 4. In this way, the outer layers of the bead are not subjected to undesired radial movements.

A substantially ring-shaped layer 14 is drawn over the segments 6. This layer 14 possesses, at its rear face at the region of the associated tire bead 3 and simultaneously at the region of the intermediate space between the segments 6, reinforcement elements 15, as best shown in FIGS. 3 and 10, which are in the form of small metallic plates or the like. In order to prevent displacement of the layer 14 relative to the segments 6 in the peripheral direction and thus to avoid shifting of the reinforcement elements 15 out of the region of the intermediate space, the layer 14 is advantageously vulcanized or adhesively bonded at the region 16 (FIGS. 2 and 10) with the segments 6.

Now in order to achieve as uniform as possible pressure distribution at the region of the tire bead it is advantageous if, as indicated for the embodiment of FIG. 4, the layer 14 is constructed to be bellows-shaped at the tire bead region and possesses a hollow space or compartment 18 which, if desired, can be expanded, heated or cooled by any suitable imcompressible fluid medium. In order to avoid any undesired elongation of the bellows in the direction of the arrow 19, it is advantageous if the bellows possesses at such region reinforcement inserts 20. In order to realize an optimum sealing effect in the bead region between the tire bead 3 and the layer 14, it is advantageous if the layer is provided at this region with a profiling 21, for instance, in the form of ribs and/or grooves as shown in the embodiment of FIG. 5a and/or a layer or coating 22 preventing sticking as shown in the embodiment of FIG. 5b.

Figure 6:
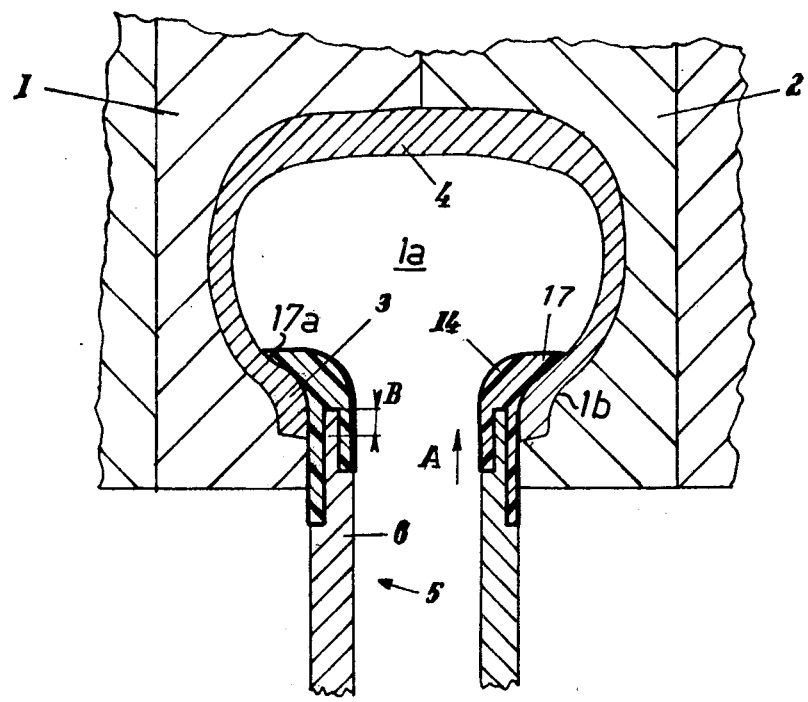
FIG. 6 is a schematic sectional view through a further embodiment of the inventive vulcanization apparatus.

Considering now FIG. 6, there is illustrated a somewhat modified form of tire vulcanization apparatus from that shown and described in conjunction with FIGS. 1 to 3 inclusive. Since the vulcanization equipment of FIG. 6 for the most part is quite similar to that shown and described in conjunction with FIG. 1, there has only been depicted as a matter of convenience in illustration the portion of such vulcanization equipment containing modifications from the arrangement of FIG. 1. Also, as a matter of convenience the same reference characters have been generally used for the same or analogous components. In this embodiment, however, each continuous layer 14 drawn over the segments 6 will now be understood to contain a lip member 17 (FIG. 7) which is directed towards the associated tire bead and, for instance, decreases in thickness in the direction of its free end. This lip member 17 is, first of all, itself sealingly pressed against the tire bead by the action of the inflowing vulcanization medium. The lip member 17 may be provided at its contact region with the tire bead with an at least partially convex portion, generally indicated by reference character 17a in FIG. 6, and preferably possessing a radius of curvature essentially corresponding to that of the associated tire bead section.

The essential sealing effect of the lip member 17 is, however, realized if the segments 6 are moved radially outwardly over the resistance of the layer 14 in the direction of the arrow A, so that the lip member 17, owing to the marginal stress prevailing at the outer periphery, is forced to deviate in the direction of the associated tire bead 3 and sealingly presses thereagainst. The lip member 17 extends freely past the segments 6 and confronts the associated mold halves 1, 2 in a bowl-like fashion.

Figure 8:
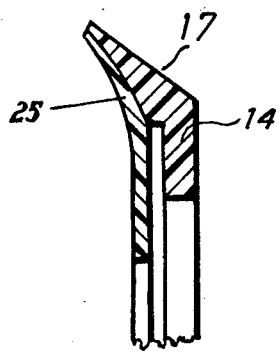
FIGS. 8 and 9 each show in partial sectional view further exemplary embodiments of contact mechanisms.

Now in the embodiment of FIG. 8 the aforediscussed deviation movement of the lip member 17 is assisted by providing such lip member with a layer or coating 25 at the side confronting the tire bead, which layer 25 possesses a greater tensile strength than the remainder of the lip member 17. Hence, the lip member 17 is formed of different strength material layers.

Figure 9:
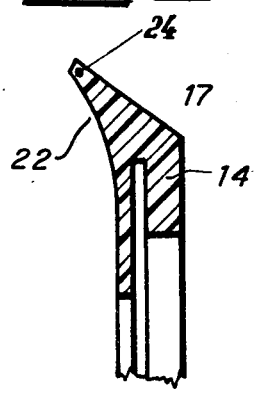

As best seen by referring to FIG. 9, the marginal stress can also be further increased by the provision of a ring-shaped reinforcement 24 arranged at the outer periphery of the lip member 17, which reinforcement may be in the form of a helical spring.

In order to facilitate raising of the layer 14 and the lip member 17 from the tire bead, such are advantageously provided with a coating or layer, as indicated by reference character 22 in FIG. 9, which prevents the lip member 17 from sticking to the tire bead, for instance in a manner similar to the layer 22 discussed above in conjunction with FIG. 5b. Of course, the function of this layer or coating can be also assumed by a suitably prepared material of the lip member 17.

Referring again to FIG. 6, the length of the path B of the segments 6 extending over the resistance of the layer 14 is dependent upon the size of the layer 14 and the lip member 17 as well as its elasticity and the radius of curvature of the associated tire portions.

With the embodiment of equipment under discussion, the segments 6 and, therefore, the layer 14 are radially brought into an outer contact position, whereafter the contact mechanism is moved in the axial direction towards the momentary associated tire bead 3 of the tire 4. After application of the contact mechanism against the tire bead 3, then by means of a brief further shifting of the segments 6 in the radial direction there is brought about deviation of the lip member 17 and its optimum sealing with the tire bead.

Finally, it is to be mentioned by way of completeness that various features of the invention disclosed herein in the different embodiments may be combined with one another without departing from the basic concepts of this development.

While there is shown and described present preferred embodiments of the invention, it is to be distinctly understood that the invention is not limited thereto but may be otherwise variously embodied and practiced within the scope of the following claims, ACCORDINGLY,

What is claimed is:

1. An apparatus for the bellowless vulcanization of tire blanks, comprising means forming a tire vulcanization mold including tire bead sections, clamping mechanism for the tire beads provided for said mold, said clamping mechanism comprising the associated bead section of the vulcanization mold and a contact mechanism, means operable from outside said mold for moving said contact mechanism radially outwardly relative to the center of the mold into confronting relation with the associated bead section and axially toward the associated bead section, said contact mechanism comprising a ring formed of a number of segments, and an integrally-formed ring-shaped member secured to and movable with the segments of said ring, said ring-shaped member including a non-segmented, endless layer of elastomeric material for sealingly engaging a respective tire bead section when moved thereagainst by the contact mechanism thereby permitting a vulcanization operation without the need for a bellows.

2. Apparatus as defined in claim 1, said segments being circumferentially spaced from one another when said contact mechanism is moved to its radially outermost position, and wherein said endless layer of elastomeric material bridges the spaces between said segments.

3. Apparatus as defined in claim 2, said ring-shaped member including a plurality of reinforcing elements for reinforcing said endless layer of elastomeric material in the regions where said material bridges the spaces between said segments.

4. Apparatus as defined in claim 1, said endless layer is provided with a lip member directed towards the associated tire bead section of the mold, a ring-shaped reinforcement arranged at the outer periphery of the lip member, and the ring-shaped reinforcement is formed by a helical spring.

* * * * *